(12) United States Patent
Choi et al.

(10) Patent No.: US 9,391,464 B2
(45) Date of Patent: Jul. 12, 2016

(54) EXTERNAL BATTERY FOR DETERMINING THE AMPLITUDE OF CHARGE CURRENT

(71) Applicant: Samsung SDI Co., Ltd., Yongin-si, Gyeonggi-do (JP)

(72) Inventors: Ji-Yeon Choi, Gyeonggi-do (KR); Heui-Sang Yoon, Gyeonggi-do (KR); Hyung-Sin Kim, Gyeonggi-do (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 178 days.

(21) Appl. No.: 14/192,726

(22) Filed: Feb. 27, 2014

(65) Prior Publication Data

US 2014/0312830 A1    Oct. 23, 2014

(30) Foreign Application Priority Data

Apr. 18, 2013 (KR) .................. 10-2013-0043021

(51) Int. Cl.
*H02J 7/00* (2006.01)
*H01M 10/42* (2006.01)
*H01M 10/46* (2006.01)

(52) U.S. Cl.
CPC .......... *H02J 7/0011* (2013.01); *H01M 10/425* (2013.01); *H01M 10/46* (2013.01); *H02J 7/0006* (2013.01)

(58) Field of Classification Search
CPC ...... Y02E 60/12; H02J 7/0042; H02J 7/0045; H02J 7/008; H02J 7/0073; H02J 7/0081; H01M 10/46; H01M 10/44
USPC ....................................... 320/107
See application file for complete search history.

(56) References Cited

U.S. PATENT DOCUMENTS

| 5,557,189 A * | 9/1996 | Suzuki | H01M 10/44 320/119 |
| 5,734,253 A * | 3/1998 | Brake | H02J 7/0027 320/125 |
| 5,739,596 A * | 4/1998 | Takizawa | G06F 1/263 307/64 |
| 8,766,602 B1 * | 7/2014 | Kimes | H02J 7/00 320/137 |
| 2002/0026548 A1 * | 2/2002 | Frank | H02J 9/062 710/100 |
| 2011/0095722 A1 | 4/2011 | Chang | |
| 2013/0181659 A1 * | 7/2013 | Chang | H01M 10/44 320/107 |

FOREIGN PATENT DOCUMENTS

| JP | 2011-259658 A | 12/2011 |
| KR | 10-2000-0069108 A | 11/2000 |
| KR | 10-2011-0044067 A | 4/2011 |
| WO | WO 2011/154815 A2 | 12/2011 |

\* cited by examiner

*Primary Examiner* — Arun Williams
(74) *Attorney, Agent, or Firm* — Knobbe, Martens, Olson & Bear, LLP

(57) ABSTRACT

An external battery is disclosed. In one aspect, the external battery includes a battery and an input stage configured to receive external power and output a control signal. The external battery also includes a charger configured to convert the external power into a plurality of charge currents based at least in part on the resistance of at least one resistor detected at a control terminal of the charger, wherein the control terminal is electrically connected to the resistor, wherein the charge currents have different amplitudes, wherein the charger is further configured to provide the converted charge currents to the battery. The external battery further includes a controller configured to control the magnitude of the resistance of the resistor based at least in part on i) the control signal and ii) at least one switch.

17 Claims, 3 Drawing Sheets

| Embodiment | Charger specification | Control signal | First switch | Second switch | ISET resistance | Charge current |
|---|---|---|---|---|---|---|
| 1 | A company 5V/1A | 1.034V | OFF | ON | R1 | I1 |
| 2 | A company 5V/2A | 0.632V | OFF | ON | R1 | I1 |
| 3 | B company 5V/1A | 1.036V | OFF | ON | R1 | I1 |
| 4 | B company 5.1V/2.1A | 1.140V | OFF | ON | R1 | I1 |
| 5 | D+,D- No-connection | 1.366V | ON | OFF | R1+R2 | I2 |

EXTERNAL BATTERY FOR DETERMINING THE AMPLITUDE OF CHARGE CURRENT

CROSS-REFERENCE TO RELATED APPLICATIONS

This application claims priority to and the benefit of Korean Patent Application No. 10-2013-0043021, filed on Apr. 18, 2013, in the Korean Intellectual Property Office, the entire contents of which are incorporated herein by reference in their entirety.

BACKGROUND

1. Field

The described technology generally relates to an external battery.

2. Description of the Related Technology

Electronic devices, e.g., a notebook computer, a cellular phone, a personal digital assistant (PDA) and the like have recently been developed to be portable. The portable electronic devices mainly receive electric energy for use, supplied through batteries. The functions of the portable electronic devices have recently been diversified so that several functions can be performed with one portable electronic device by adding other functions to the portable electronic device in addition to its unique functions.

This increases the energy demand, and accordingly, a basic battery having a larger capacity is desirable. To this end, an external battery has been developed, which can be used not by being attached to a portable electronic device but by being carried.

SUMMARY OF CERTAIN INVENTIVE ASPECTS

One inventive aspect is to provide an external battery capable of determining the amplitude of charge current according to specifications of a charger without using a main controller unit (MCU) or a microcontroller.

Another aspect is an external battery, including: a battery; a charge unit converting external power supplied from a travel adapter to an input stage into charge currents having different amplitudes depending on the resistance of a resistor connected to a control terminal, and supplying the converted charge currents to the battery; and a control circuit controlling the resistance of the resistor connected to the control terminal, using a control signal output from the input stage and at least one switch.

The control circuit may include first and second resistors connected in series between the control terminal and a ground; a first switch having a control electrode connected to the input stage, a first electrode connected to a first node, and a second electrode connected to the ground; and a second switch having a control electrode connected to the first node, a first electrode connected to a common node of the first and second resistors, and a second electrode connected to the ground.

The control unit may further include a third resistor connected between the first node and a first voltage terminal. The first switch may be turned on or turned off by the control signal input to the control electrode thereof. The second switch may be turned on when the first switch is turned off, and may be turned off when the first switch is turned on.

When the second switch is turned on, the resistance of the resistor connected to the control terminal of the charge unit may be determined as the resistance of the first resistor.

When the second switch is turned off, the resistance of the resistor connected to the control terminal of the charge unit may be determined as resistance obtained by adding the resistance of the first resistor and the resistance of the second resistor.

The input stage may include a power terminal connected to a power pin of the travel adapter, and a data terminal connected to a data pin of the travel adapter. The control electrode of the first switch may be connected to the data terminal of the input stage.

The control signal may be a voltage applied to the data pin. The charge unit may convert the power terminal supplied to the power terminal of the input stage into the charge current, and supply the converted charge current to the battery.

The external battery may further include a DC-DC conversion unit converting an output voltage of the battery into a voltage having an amplitude different from that of the output voltage, and transmitting the converted voltage to an output stage connected to an external device.

Another aspect is an external battery, comprising: a battery; an input stage configured to receive external power and output a control signal; a charger configured to convert the external power into a plurality of charge currents based at least in part on the resistance of at least one resistor detected at a control terminal of the charger, wherein the control terminal is electrically connected to the resistor, wherein the charge currents have different amplitudes, and wherein the charger is further configured to provide the converted charge currents to the battery; and a controller configured to control the magnitude of the resistance of the resistor based at least in part on i) the control signal and ii) at least one switch.

In the above external battery, the at least one resistor includes first and second resistors electrically connected in series between the control terminal and a ground, and wherein the controller includes: a first switch comprising i) a control electrode electrically connected to the input stage, ii) a first electrode electrically connected to a first node, and iii) a second electrode electrically connected to the ground; and a second switch comprising i) a control electrode electrically connected to the first node, ii) a first electrode electrically connected to a common node of the first and second resistors, and iii) a second electrode electrically connected to the ground.

In the above external battery, the controller includes the first and second resistors therein. In the above external battery, the controller further includes a third resistor electrically connected between the first node and a first voltage terminal. In the above external battery, the first switch is configured to be turned on or turned off based at least in part on the control signal input to the control electrode thereof. In the above external battery, the second switch is configured to be turned on when the first switch is turned off, and is configured to be turned off when the first switch is turned on. In the above external battery, when the second switch is turned on, the controller is configured to determine the resistance of the first resistor as the resistance of the at least one resistor.

In the above external battery, when the second switch is turned off, the controller is configured to determine the combined resistance of the first and second resistors as the resistance of the at least one resistor. In the above external battery, the input stage is configured to be connected to an adapter, wherein the input stage includes i) a power terminal electrically connected to a power pin of the adapter and ii) a data terminal electrically connected to a data pin of the adapter. In the above external battery, wherein the control electrode of the first switch is electrically connected to the data terminal of the input stage. In the above external battery, the control signal is a voltage applied to the data pin. In the above external battery, the charger is configured to convert the external power supplied to the power terminal of the input stage into the charge current, and provide the converted charge current to the battery. The above external battery further comprises a DC-DC convert configured to convert an output voltage of the battery into a voltage having an amplitude different from that of the output voltage, and to provide the converted voltage to an output stage electrically connected to an external device.

Another aspect is an external battery, comprising: a battery; a charger configured to convert external power into a plurality of charge currents based at least in part on the resistance of at least one resistor detected at a control terminal of the charger, wherein the control terminal is electrically connected to the resistor, wherein the charge currents have different amplitudes, and wherein the charger is further configured to provide the converted charge currents to the battery; and a controller comprising at least one switch electrically connected to the charger and configured to control the magnitude of the resistance of the resistor based at least in part on the switch.

The external battery further comprises a DC-DC converter configured to convert an output voltage of the battery into a voltage having an amplitude different from that of the output voltage, and provide the converted voltage to an external device. The external battery further comprises: first and second resistors electrically connected in series between a control terminal of the charger and a ground; a first switch comprising i) a control electrode electrically connected to the input stage, ii) a first electrode electrically connected to a first node, and iii) a second electrode electrically connected to the ground; and a second switch comprising a control electrode electrically connected to the first node, a first electrode electrically connected to a common node of the first and second resistors, and a second electrode electrically connected to the ground. In the above external battery, the first switch is configured to be turned on when the second switch is turned off, and wherein the first switch is configured to be turned off when the second switch is turned on.

Another aspect is an external battery, comprising: a battery; an input stage configured to receive external power and output a control signal; a charger configured to convert external power into a plurality of charge currents based at least in part on the resistance of at least one of a plurality of resistors electrically connected to a control terminal of the charger, wherein the charge currents have different amplitudes, and wherein the charger is further configured to provide the converted charge currents to the battery; and a plurality of switches configured to receive the control signal and electrically connected to the resistors, and wherein the switches are configured to control the magnitude of the resistance based at least in part on the control signal.

In the above external battery, the external battery does not require a microcontroller. In the above external battery, the resistors comprise first and second resistors, wherein the switches comprise a first switch connected between the first and second resistors and a second switch connected between the first switch and the input stage.

DETAILED DESCRIPTION OF CERTAIN INVENTIVE EMBODIMENTS

Figure 1:
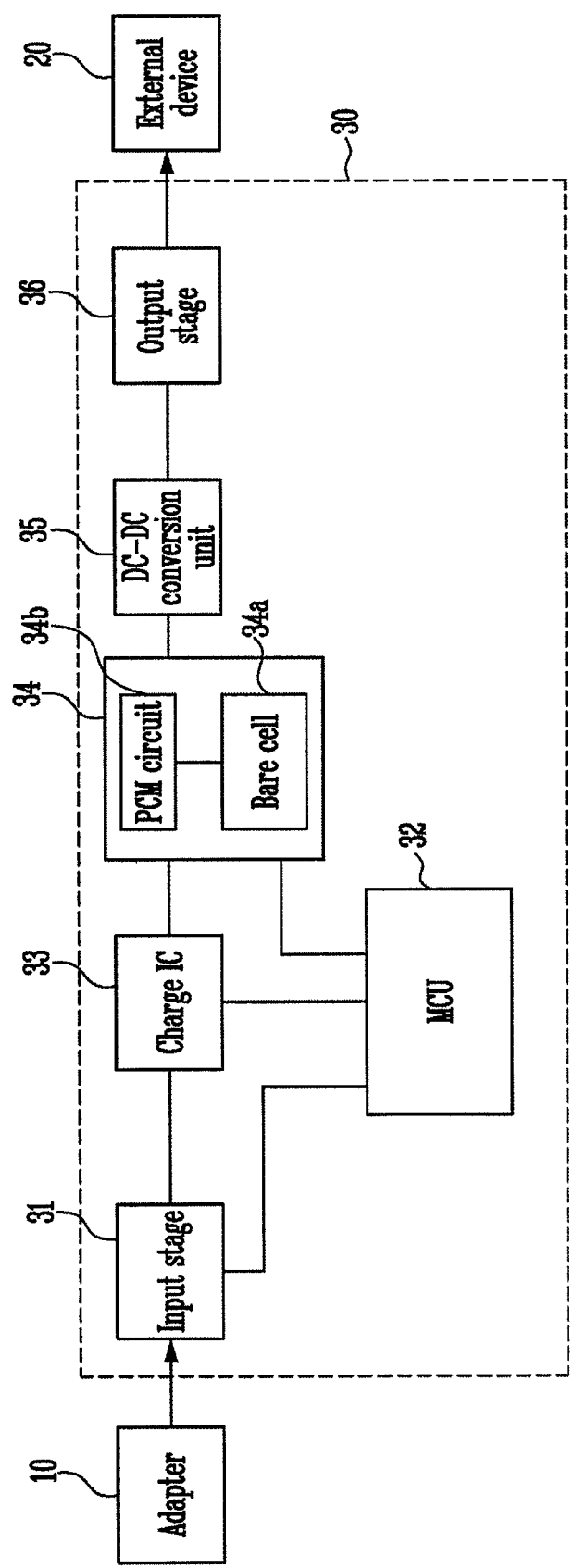
FIG. 1 is a block diagram schematically showing the configuration of an external battery.

FIG. 1 is a block diagram schematically showing the configuration of an external battery. Referring to FIG. 1, an input stage 31 of the external battery 30 receives external power supplied from a travel adapter 10. The maximum output current of the travel adapter 10 is varied depending on specifications of the travel adapter 10, and the charge current supplied to a battery may need to be controlled.

A main controller unit (MCU) or a microcontroller 32 detects the kind of the travel adapter 10 by sensing the voltage of the input stage 31, and controls the amplitude of the maximum charge current output from a charge integrated circuit (IC) 33. The charge IC 33 converts the external power supplied to the input stage 31 into charge current, and supplies the converted charge current to a battery 34. The voltage output from the battery 34 is boosted through a DC-DC conversion unit 35, and the boosted voltage is supplied to an external device 20 through an output stage 36.

However, in a case where the MCU 32 is used to determine the maximum charge current of the charge IC as described above, the resources of developing firmware for the MCU and the number of manufacturing processes due to the use of the MCU are increased.

Hereinafter, certain exemplary embodiments according to the disclosed technology will be described with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout. Here, when a first element is described as being connected to a second element, the first element may be not only directly connected to the second element but may also be indirectly connected to the second element via a third element. Further, some of the elements that are not essential to the complete understanding of the disclosed embodiments are omitted for clarity. Also, like reference numerals refer to like elements throughout.

Figure 2:
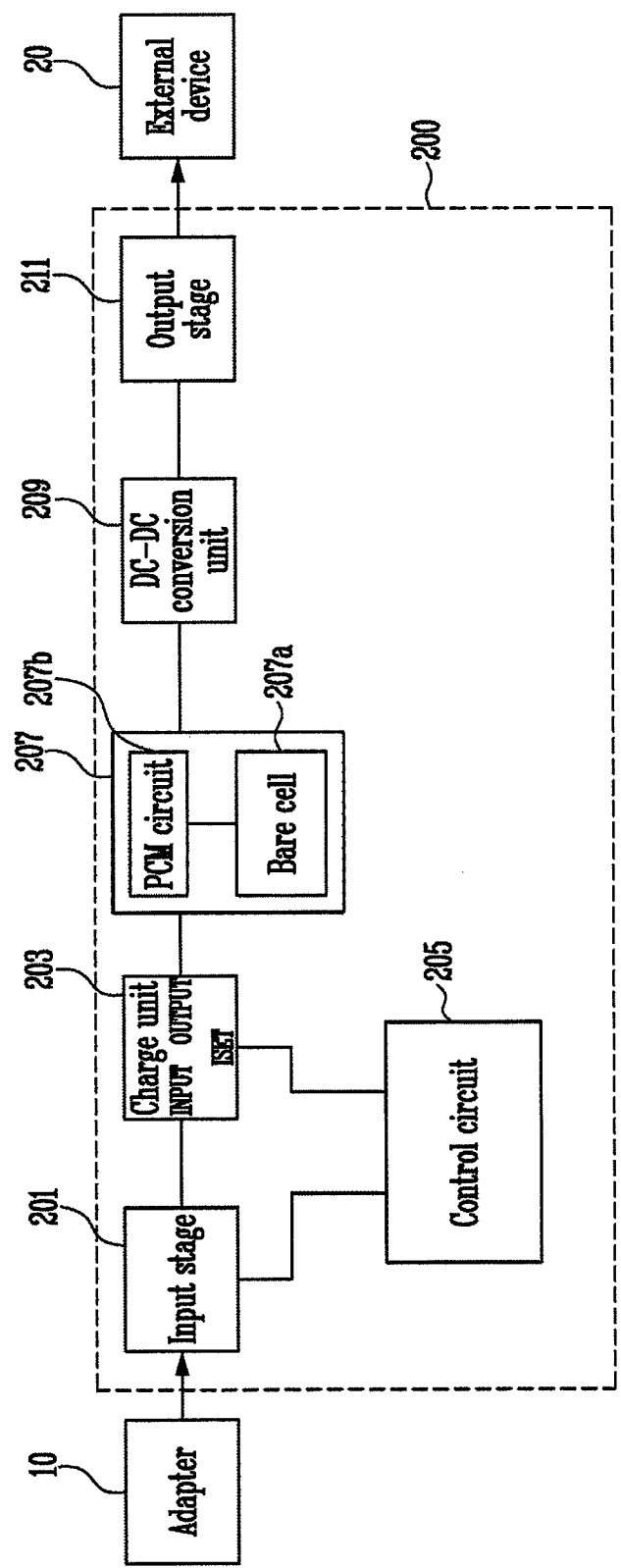
FIG. 2 is a block diagram showing an external battery according to one embodiment of the disclosed technology.

FIG. 2 is a block diagram showing an external battery according to an embodiment of the disclosed technology.

Referring to FIG. 2, the external battery 200 may include an input stage 201, a charge unit (or charger) 203, a charge current control circuit (or controller) 205, a battery 207, a DC-DC conversion unit (or DC-DC converter) 209 and an output stage 211.

The input stage 201 is electrically connected to a terminal of a travel adapter 10, and transmits, to the charge unit 203, external power supplied from the travel adapter 10. The input stage 201 may be implemented in various forms according to the travel adapter 10.

The charge unit 203 generates charge current, using external power supplied from the input stage 201 to an input terminal INPUT thereof, and then supplies the generated charge current to the battery 207 through an output terminal OUTPUT thereof. The amplitude of the maximum charge current output from the charge unit 203 may be changed depending on specifications of the travel adapter 10 electrically connected to the input stage 201. The charge unit 203 may determine the amplitude of the charge current, using a resistor electrically connected to a control terminal ISET thereof according to the specifications of the travel adapter 10.

The control circuit 205 controls the resistance of the resistor electrically connected to the control terminal ISET of the charge unit 203, using a control signal output from the input stage 201 and at least one switch.

The battery 207 includes a bare cell 207a and a protection circuit module (PCM) circuit 207b electrically connected to the bare cell 207a.

The bare cell 207a is a rechargeable battery cell sealed inside a battery case in a state in which an electrode assembly having a positive electrode/separator/negative electrode structure is immersed in a lithium electrolyte. The electrode assembly is generally classified into a jelly-roll type (winding type) electrode assembly and a stacking type electrode assembly. Here, the jelly-roll type (winding type) electrode assembly is formed by winding round a long sheet-shaped positive and negative electrodes each having an active material coated on both surfaces thereof in a state in which a separator is interposed between the positive and negative electrodes. The stacking type electrode assembly is formed by sequentially stacking a plurality of positive and negative electrodes with a predetermined size, each having an active material coated on both surfaces thereof in a state in which a separator is interposed between the positive and negative electrodes.

The bare cell 207a may include cylindrical and prismatic bare cells in which an electrode assembly is accommodated in a battery case made of a metal can, and a pouch-type bare cell in which an electrode assembly is accommodated in a battery case made of an aluminum laminate sheet, according to the shape of the bare cell. The bare cell 207a may have a structure in which two or more bare cells are electrically connected in series and/or parallel.

The PCM circuit 207b electrically connected to the bare cell 207a controls overcharge voltage, overdischarge voltage and discharge overcurrent of the bare cell 207a, thereby protecting the bare cell 207a. The PCM circuit 207b is not a main component of the disclosed technology, and therefore, its detailed description will be omitted.

The DC-DC conversion unit 209 converts voltage output from the battery 207 into voltage with an amplitude for driving an external device 20, and transmits the converted voltage to the output stage 211.

The output stage 211 is electrically connected to the external device 20, so as to transmits, to the external device 20, electric power supplied from the battery 207. The output stage 211 may be implemented in various forms according to the external device 20.

Figures 3, 4:
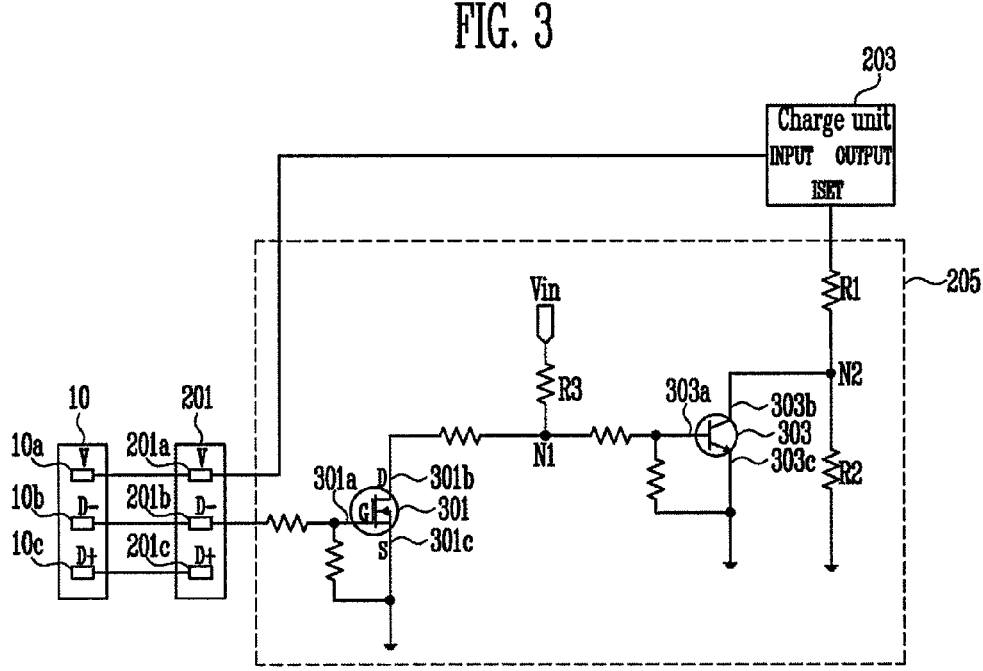
FIG. 3 is a circuit diagram showing the structure of a charge current control circuit according to one embodiment of the disclosed technology.
FIG. 4 is a table showing different exemplary embodiments of charge current controlled in a charge unit according to the operation of the control circuit.

FIG. 3 is a circuit diagram showing the structure of a charge current control circuit according to one embodiment of the disclosed technology.

Referring to FIG. 3, the control circuit 205 may include first and second resistors R1 and R2 electrically connected in series between the control terminal ISET of the charge unit 203 and a ground, a first switch 301 and a second switch 303.

The first switch 301 includes a control electrode 301a electrically connected to the input stage 210, a first electrode 301b electrically connected to a first node N1, and a second electrode 301c electrically connected to the ground.

The second switch 303 includes a control electrode 303a electrically connected to the first node N1, a first electrode 303b electrically connected to a common node N2 of the first and second resistors R1 and R2, and a second electrode 303c electrically connected to the ground.

A third resistor R3 is electrically connected in series between the first node N1 and a first voltage terminal Vin.

Subsequently, the operating principle of the control circuit 205 will be described. The first switch 301 is turned on or turned off by the amplitude of a control signal input from the input stage 201 to the control electrode 301a of the first switch 301.

Here, the control signal may have the amplitude of voltage changed depending to the specifications of the travel adapter 10 electrically connected to the input stage 201. The first switch 301 may be turned on when the amplitude of the control signal is equal to or greater than a predetermined value.

In some embodiments where the first switch 301 is turned off, the second switch 303 is turned on by the voltage supplied from the first voltage terminal Vin to the first electrode 303a. When the second switch 303 is turned on, the common node N2 is electrically connected to the ground via the second electrode 303c of the second switch 303, and therefore, the resistance of the resistor electrically connected to the control terminal ISET is determined as the resistance of the first resistor R1.

In some embodiments where the first switch 301 is in a turn-on state, the voltage terminal Vin is electrically connected to the ground via the second electrode 301c of the first switch 301, so that the second switch 303 is turned off. In a case where the second switch 303 is turned off, the resistance of the resistor connected to the control terminal ISET is determined as resistance obtained by adding the resistance of the first resistor R1 and the resistance of the second resistor R2.

Although it has been illustrated in FIG. 3 that the first switch 301 is a field effect transistor (FET) and the second switch 303 is an NPN transistor, other configurations can be used. For example, at least one of the first and second switches 301 and 302 can be a junction FET (JFET), a metal-semiconductor FET (MESFET), a modulation-doped FET (MODFET), a metal-oxide-semiconductor FET (MOSFET), an n-channel MOSFET (NMOSFET), a p-channel MOSFET (PMOSFET) and an organic FET (OFET). Each of the switches 301 and 302 may also include bipolar transistors. The switches 301 and 302 may further include other switching devices such as digital or analog switches or a relay.

The travel adapter 10 may include a universal serial bus (USB) terminal having a power pin 10a, a first data pin 10b and a second data pin 10c. The input stage 201 may include a power terminal 201a electrically connected to the power pin 10a, and first and second data terminals 201b and 201c respectively electrically connected to the first and second data pins 10b and 10c.

In this case, the control signal output from the input stage 201 to the control electrode 301a of the first switch 301 may have the amplitude of voltage applied to the first or second data terminal 201b or 201c.

FIG. 4 is a table showing embodiments of charge current controlled in a charge unit according to the operation of the control circuit.

In some embodiments, the first switch 301 is turned on when the amplitude of the control signal is about 1.2V or more. In other embodiments, the first switch 301 may be turned on when the amplitude of the control signal is another voltage.

Referring to FIG. 4, since the amplitudes of control signals output from the first data terminal 201*b* (D-) are less than about 1.2V in Embodiments 1 to 4, the first switch 301 is turned off and the second switch 303 is turned on. Thus, the resistor electrically connected to the control electrode ISET of the charge unit 203 becomes R1, and accordingly, the charge current output from the charge unit 203 becomes I1.

In Embodiment 5, the amplitude of the control signal applied to the first data terminal 201*b* is 1.366V, and hence the first switch 301 is turned on. Thus, the second switch 303 is turned off, and the resistor electrically connected to the control terminal ISET of the charge unit 203 becomes R1 and R2 electrically connected in series. Accordingly, the charge current output from the charge unit 203 becomes I2.

Embodiments 1 and 2 show results obtained by performing a test using a charge adapter manufactured by 'A company', and Embodiments 3 and 4 show results obtained by performing a test using a charge adapter manufactured by "B company". Embodiment 5 shows a result obtained by performing a test using a travel adapter having no data pin (10*b* and 10*c*).

As described above, it is possible to control the amplitude of an output signal of the charge unit 203, using a plurality of switch elements driven according to a control signal output from the input stage 201, without providing a separate an MCU or a microcontroller to the external battery. According to at least one of the disclosed embodiments, it is possible to provide an external battery capable of controlling the amplitude of charge current changed depending on specifications of a charger without using a high-priced MCU.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the following claims.

What is claimed is:

1. An external battery, comprising:
   a battery;
   an, input stage configured to receive external power and output a control signal;
   a control circuit comprising at least one resistor and at least one switch and configured to control the magnitude of the resistance of a control terminal by controlling the at least one switch based on the control signal so that at least part of the at least one resistor is electrically connected to the control terminal; and
   a charger configured to convert the external power into a plurality of charge currents based on the magnitude of the resistance of the control terminal, wherein the charge currents have different amplitudes, and configured to provide the converted plurality of charge currents to the battery.

2. The external battery of claim 1, wherein the at least one resistor includes first and second resistors electrically connected in series between the control terminal and a ground, and wherein the at least one switch includes:
   a first switch comprising i) a control electrode electrically connected to the input stage, ii) a first electrode electrically connected to a first node, and iii) a second electrode electrically connected to the ground; and
   a second switch comprising i) a control electrode electrically connected to the first node, ii) a first electrode electrically connected to a common node of the first and second resistors, and iii) a second electrode electrically connected to the ground.

3. The external battery of claim 2, wherein the control signal has the amplitude of voltage configured to change depending on the specifications of an adapter electrically connected to the input stage.

4. The external battery of claim 3, wherein the control circuit further includes a third resistor electrically connected between the first node and a first voltage terminal.

5. The external battery of claim 2, wherein the first switch is configured to be turned on or turned off based at least in part on the control signal input to the control electrode thereof.

6. The external battery of claim 5, wherein the second switch is configured to be turned on when the first switch, is turned off, and is configured to be turned off when the first switch is turned on.

7. The external battery of claim 6, wherein, when the second switch is turned on, the control circuit is configured to determine the resistance of the first resistor as the resistance of the at least one resistor.

8. The external battery of claim 6, wherein, when the second switch is turned off, the control circuit is configured to determine the combined resistance of the first and second resistors as the resistance of the at least one resistor.

9. The external battery of claim 2, wherein the input stage is configured to be connected to an adapter, wherein the input stage includes i) a power terminal electrically connected to a power pin of the adapter and ii) a data terminal electrically connected to a data pin of the adapter.

10. The external battery of claim 9, wherein the control electrode of the first switch is electrically connected to the data terminal of the input stage.

11. The external battery of claim 9, wherein the control signal is a voltage applied to the data pin.

12. The external battery of claim 9, wherein the charger is configured to convert the external power supplied to the power terminal of the input stage into the charge current, and provide the converted charge current to the battery.

13. The external battery of claim 1, further comprising a DC-DC convert configured to convert an output voltage of the battery into a voltage having an amplitude different from that of the output voltage, and to provide the converted voltage to an output stage electrically connected to an external device.

14. An external battery, comprising:
   a battery;
   a control circuit comprising at least one resistor and at least one switch and configured to control the magnitude of the resistance of a control terminal by controlling the at least one switch based on the control signal so that at least part of the at least one resistor is electrically connected to the control terminal; and
   a charger configured to convert external power into a plurality of charge currents based on the magnitude of resistance of the control terminal of the charger, wherein the charge currents have different amplitudes, and wherein the charger is further configured to provide the converted plurality of charge currents to the battery.

15. The external, battery of claim 14, further comprising a DC-DC converter configured to convert an output voltage of the battery into a voltage having an amplitude different from that of the output voltage, and provide the converted voltage to an external device.

16. The external battery of claim 14,
wherein the least one resistor includes first and second resistors electrically connected in series between a control terminal of the charger and a ground, and
wherein the least one switch includes:
a first switch comprising i) a control electrode electrically connected to the input stage, ii) a first electrode electrically connected to a first node, and iii) a second electrode electrically connected to the ground; and
a second switch comprising a control electrode electrically connected to the first node, a first electrode electrically connected to a common node of the first and second resistors, and a second electrode electrically connected to the ground.

17. The external battery of claim 16, wherein the first switch is configured to be turned on when the second switch is turned off, and wherein the first switch is configured to be turned off when the second switch is turned on.

\* \* \* \* \*